US009935865B2

(12) United States Patent
Ganesan et al.

(10) Patent No.: US 9,935,865 B2
(45) Date of Patent: Apr. 3, 2018

(54) SYSTEM AND METHOD FOR DETECTING AND PREVENTING SERVICE LEVEL AGREEMENT VIOLATION IN A VIRTUALIZED ENVIRONMENT

(71) Applicant: Infosys Limited, Bangalore (IN)

(72) Inventors: Rajeshwari Ganesan, Bangalore (IN); Santonu Sarkar, Bangalore (IN); Arpan Roy, Kolkata (IN)

(73) Assignee: Infosys Limited, Bangalore (IN)

( * ) Notice: Subject to any disclaimer, the term of this patent is extended or adjusted under 35 U.S.C. 154(b) by 142 days.

(21) Appl. No.: 14/737,977

(22) Filed: Jun. 12, 2015

(65) Prior Publication Data

US 2015/0372878 A1 Dec. 24, 2015

(30) Foreign Application Priority Data

Jun. 23, 2014 (IN) .......................... 3027/CHE/2014

(51) Int. Cl.
*H04L 12/26* (2006.01)
*H04L 12/24* (2006.01)

(52) U.S. Cl.
CPC .......... *H04L 43/16* (2013.01); *H04L 41/0896* (2013.01); *H04L 41/5025* (2013.01); *H04L 43/0817* (2013.01)

(58) Field of Classification Search
CPC . H04L 43/16; H04L 41/0896; H04L 41/5025; H04L 43/0817; H04L 41/5003; H04L 41/5029
See application file for complete search history.

(56) References Cited

U.S. PATENT DOCUMENTS

| 8,291,411 B2 | 10/2012 | Beaty et al. |
| 2008/0270213 A1* | 10/2008 | Christodoulou ....... G06Q 10/06 705/7.28 |

(Continued)

FOREIGN PATENT DOCUMENTS

AU 2011312100 A1 5/2013

OTHER PUBLICATIONS

Yiqiu Fang et al., "Energy-aware Schedule Strategy Based on Dynamic Migration of Virtual Machines in Cloud Computing" Journal of Computational Information Systems 8, May 15, 2012.

(Continued)

*Primary Examiner* — Arvin Eskandarnia
*Assistant Examiner* — Amy Ling
(74) *Attorney, Agent, or Firm* — LeClairRyan, a Professional Corporation (57) ABSTRACT

This technique determines the possible Service Level Agreement (SLA) violation during migrating a workload from a physical environment to a virtualized environment and also migrating a virtual machine (VM) from one physical machine to another within a virtualized environment. This technique uses capacity factor, i.e. the ratio of host physical machine (host PM) capacity and target physical machine (target PM) capacity, to determine the service rate change in the target PM compared to host PM and eventually calculates the VM utilization and response time in the target PM. It then checks if the VM utilization and response time in the target PM lies within the SLA limit. It further checks if the migration in the target virtualized PM is violating a pre-defined target PM utilization threshold or not and finally causes the migration in the target physical machine if all the SLA parameters are satisfied.

23 Claims, 6 Drawing Sheets

(56) References Cited

U.S. PATENT DOCUMENTS

| | | | | |
|---|---|---|---|---|
| 2008/0295096 | A1* | 11/2008 | Beaty | G06F 9/4856 |
| | | | | 718/1 |
| 2009/0070771 | A1* | 3/2009 | Yuyitung | G06Q 10/06 |
| | | | | 718/105 |
| 2011/0239215 | A1* | 9/2011 | Sugai | G06F 9/45558 |
| | | | | 718/1 |
| 2013/0085742 | A1* | 4/2013 | Barker | G06F 9/5088 |
| | | | | 703/22 |
| 2013/0305092 | A1* | 11/2013 | Jayachandran | G06F 11/0754 |
| | | | | 714/37 |

OTHER PUBLICATIONS

Saurabh Kumar Garg et al., "SLA-Based Resource Provisioning for Heterogeneous Workloads in a Virtualized Cloud Datacenter", ICA3PP 2011, Part I, LNCS 7016, pp. 371-384, 2011.

* cited by examiner

SYSTEM AND METHOD FOR DETECTING AND PREVENTING SERVICE LEVEL AGREEMENT VIOLATION IN A VIRTUALIZED ENVIRONMENT

RELATED APPLICATION DATA

This application claims priority to India Patent Application No. 3027/CHE/2014, filed Jun. 23, 2014, the disclosure of which is hereby incorporated by reference in its entirety.

FIELD OF THE INVENTION

This invention relates generally to workload migration in cloud, and in particular, to a method and apparatus for detecting and preventing Service Level Agreement (SLA) violation in a virtualized environment.

BACKGROUND

As more and more Information Technology enabled solutions and services are embracing cloud computing, applications which were traditionally hosted in on-premise and dedicated data-centers are being progressively virtualized. In a virtualized data center (VDC), a single server hosts multiple virtual machines (VMs), each running one or more applications. This brings a fundamental change in application execution. In a traditional, non-virtualized environment, a physical machine (PM) directly runs the application. Whereas in a virtualized environment, the application is run in a virtual machine which in turn is hosted in a physical machine, thereby providing an additional layer of indirection. While virtualization has a great benefit, allocation and management of resources to a VM has a bearing on the application running on it. Business applications typically serve one or more clients with a certain performance SLA. When this business application is moved from a non-virtualized environment to a virtualized one, satisfying its business service-level agreements (SLA) may get impacted. In certain other times, even within a virtualized environment, the workloads move from one virtual machine to another for providing high availability. Hence, workloads can move (either automatically or one time) under two different scenarios: a) Moving an application from physical to virtual infrastructure and b) Migrating application from one virtualized platform to another.

Presently, platform vendors offer a resource management system that offers capabilities to virtualize hardware, improve in hypervisor technology to provide better performance and fault isolation, manage VM life cycle, migrate and collocate VMs. Managing VM life-cycle includes creating a VM having certain capacity, monitor the state of VM, assign more resources to the VM, move the VM from one host to another and shutdown the VM. The above mentioned resource management system takes help of the underlying hypervisor that performs a job in isolating activities performed by processes in one VM from another.

However, none of the present resource management frameworks provide any technique to evaluate performance of SLA parameters if a workload is migrated from a physical environment to a virtualized environment. Similarly, no technique is provided by the present technology for proactive determination of the SLA violation during VM migration from one host to another. Further it does not estimate the extent of possible SLA violation during migration and also the capacity required in the new virtualized infrastructure to meet the SLA. Thus, existing products can detect if the SLA of the workload is violated in its current environment. However, it can't predict whether the workload will violate SLA if it is moved to a different virtualized infrastructure, nor can it estimate the right capacity of the target virtualized infrastructure to meet the SLA. Current approach to evaluate the above mentioned problems is ad-hoc and arrives at the correct capacity estimation of the virtualized infrastructure that can meet the SLA through empirical trial and error method. This trial and error method is time consuming and tends to overestimate the capacity which in turn causes poor utilization of the infrastructure. Also, during live migration, there is always a chance of missing SLA after moving the workload to another infrastructure.

SUMMARY

The present disclosure overcomes the above mentioned problems by providing a system for infrastructure selection based on available capacity when migrating an application from a non-virtualized environment to a virtualized one and extending the same system for infrastructure selection within a virtualized server environment when migrating an application from one virtualized physical machine to another in order to mitigate physical and virtual machine failures. This disclosure applies analytical and simulation techniques to predict response time before finalizing the target virtual machine. It further predicts SLA violation before moving the workload in new physical machine in virtual environment.

According to the present embodiment, a method for preventing Service Level Agreement (SLA) violation during migration of a virtual machine to a virtualized physical server is disclosed. The method includes determining capacity factor for host and target physical machine in the virtual environment, wherein the capacity factor is a ratio of host physical machine capacity and a target physical machine capacity. A change in service rate in the target physical machine compared to the service rate in the host physical machine is computed based on the capacity factor. Virtual machine utilization and response time in the target physical machine is determined based on the service rate change and an arrival rate of one or more jobs. Further, a checking is performed to determine if the migration of the virtual machine does not violate a predefined virtual machine utilization threshold, response time threshold or target physical machine utilization threshold. Finally, the virtual machine is migrated to the target physical machine if the predefined virtual machine utilization threshold, response time threshold and the target physical machine utilization threshold are not violated.

According to another embodiment of the present disclosure, a method for preventing Service Level Agreement (SLA) violation during workload migration from a non-virtualized environment to a virtualized environment is disclosed. The method includes determining capacity factor for host physical machine in the non-virtualized environment and target physical machine in the virtualized environment, wherein the capacity factor is a ratio of host physical machine capacity and a target physical machine capacity. A change in service rate in the target physical machine compared to the service rate in the host physical machine is computed based on the capacity factor. Virtual machine utilization and response time in the target physical machine is determined based on the service rate change and an arrival rate of one or more jobs. Further, a checking is performed to determine if the migration of the workload in the virtual environment does not violate a predefined virtual machine utilization threshold, response time threshold or target physical machine utilization threshold. Finally, the workload is migrated to the target physical machine if the predefined virtual machine utilization threshold, response time threshold and the target physical machine utilization threshold are not violated.

In an additional embodiment, an apparatus for preventing Service Level Agreement (SLA) violation during migration of a virtual machine to a virtualized physical server is disclosed. The apparatus includes one or more memory units coupled to one or more processors which are configured to execute programmed instructions stored in the memory units including determining capacity factor for host and target physical machine in the virtual environment, computing change in service rate in the target physical machine compared to the service rate in the host physical machine based on the capacity factor, determining virtual machine utilization and response time in the target physical machine based on the service rate change and an arrival rate of one or more jobs, checking if the virtual machine utilization and response time in the target physical machine are within a predefined virtual machine utilization threshold and response time threshold, checking if the virtual machine migration in the target physical machine is violating a predefined target physical machine utilization threshold and migrating the virtual machine to the target physical machine if the predefined virtual machine utilization threshold, response time threshold and the target physical machine utilization threshold are not violated.

In another embodiment, an apparatus for preventing Service Level Agreement (SLA) violation during workload migration from a non-virtualized environment to a virtualized environment is disclosed. The apparatus includes one or more memory units coupled to one or more processors which are configured to execute programmed instructions stored in the memory units including determining capacity factor for host physical machine in the non-virtualized environment and target physical machine in the virtualized environment, computing change in service rate in the target physical machine compared to the service rate in the host physical machine based on the capacity factor, determining virtual machine utilization and response time in the target physical machine based on the service rate change and an arrival rate of one or more jobs, checking if the virtual machine utilization and response time in the target physical machine are within a predefined virtual machine utilization threshold and response time threshold, checking if the workload migration in the target physical machine is violating a predefined target physical machine utilization threshold and migrating the workload to the target physical machine if the predefined virtual machine utilization threshold, response time threshold and the target physical machine utilization threshold are not violated.

In another embodiment of the present disclosure, a non-transitory computer readable storage medium for preventing Service Level Agreement (SLA) violation during migration of a virtual machine to a virtualized physical server is disclosed. The computer readable storage medium which is not a signal stores computer executable instructions for determining capacity factor for host and target physical machine in the virtual environment, computing change in service rate in the target physical machine compared to the service rate in the host physical machine based on the capacity factor, determining virtual machine utilization and response time in the target physical machine based on the service rate change and an arrival rate of one or more jobs, checking if the virtual machine utilization and response time in the target physical machine are within a predefined virtual machine utilization threshold and response time threshold, checking if the virtual machine migration in the target physical machine is violating a predefined target physical machine utilization threshold and migrating the virtual machine to the target physical machine if the predefined virtual machine utilization threshold, response time threshold and the target physical machine utilization threshold are not violated.

In another embodiment, a non-transitory computer readable storage medium for preventing Service Level Agreement (SLA) violation during workload migration from a non-virtualized environment to a virtualized environment is disclosed. The computer readable storage medium which is not a signal stores computer executable instructions for determining capacity factor for host physical machine in the non-virtualized environment and target physical machine in the virtualized environment, computing change in service rate in the target physical machine compared to the service rate in the host physical machine based on the capacity factor, determining virtual machine utilization and response time in the target physical machine based on the service rate change and an arrival rate of one or more jobs, checking if the virtual machine utilization and response time in the target physical machine are within a predefined virtual machine utilization threshold and response time threshold, checking if the workload migration in the target physical machine is violating a predefined target physical machine utilization threshold and migrating the workload to the target physical machine if the predefined virtual machine utilization threshold, response time threshold and the target physical machine utilization threshold are not violated.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. These simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a method and apparatus for preventing service level agreement (SLA) violation during workload migration in virtual environment. This includes migrating a workload from a physical environment to a virtualized environment or migrating a virtual machine (VM) from one physical machine to another within a virtualized environment. This technique uses capacity factor, i.e. the ratio of host physical machine (host PM) capacity and target physical machine (target PM) capacity, to determine the service rate change in the target PM compared to host PM and eventually calculates the VM utilization and response time in the target PM. It then checks if the VM utilization and response time in the target PM lies within the SLA limit. It further checks if the migration to the target virtualized PM is violating a predefined target PM utilization threshold or not and finally causes the migration in the target physical machine if all the SLA parameters are satisfied.

In all the embodiments of the present disclosure, the term "capacity factor" refers the ratio of the host physical machine capacity and target physical machine capacity. Further this disclosure considers three types of SLA violations which are PM utilization threshold violation, VM utilization threshold violation and response time threshold violation. The sum of the utilization of all the VMs along with the hypervisor utilization in a PM should not exceed the PM utilization threshold as mentioned in the SLA. On the other hand, VM utilization is computed from the hypervisor. Increase in VM utilization above a certain threshold as mentioned in the SLA leads to increase in the response time of workloads running on the VMs that are in direct contention with this over utilized VM. While PM and VM utilization thresholds are set by data-center management team (or service providers) along with the application owner, response time SLA violation thresholds are specified by the application owners.

Figure 1:
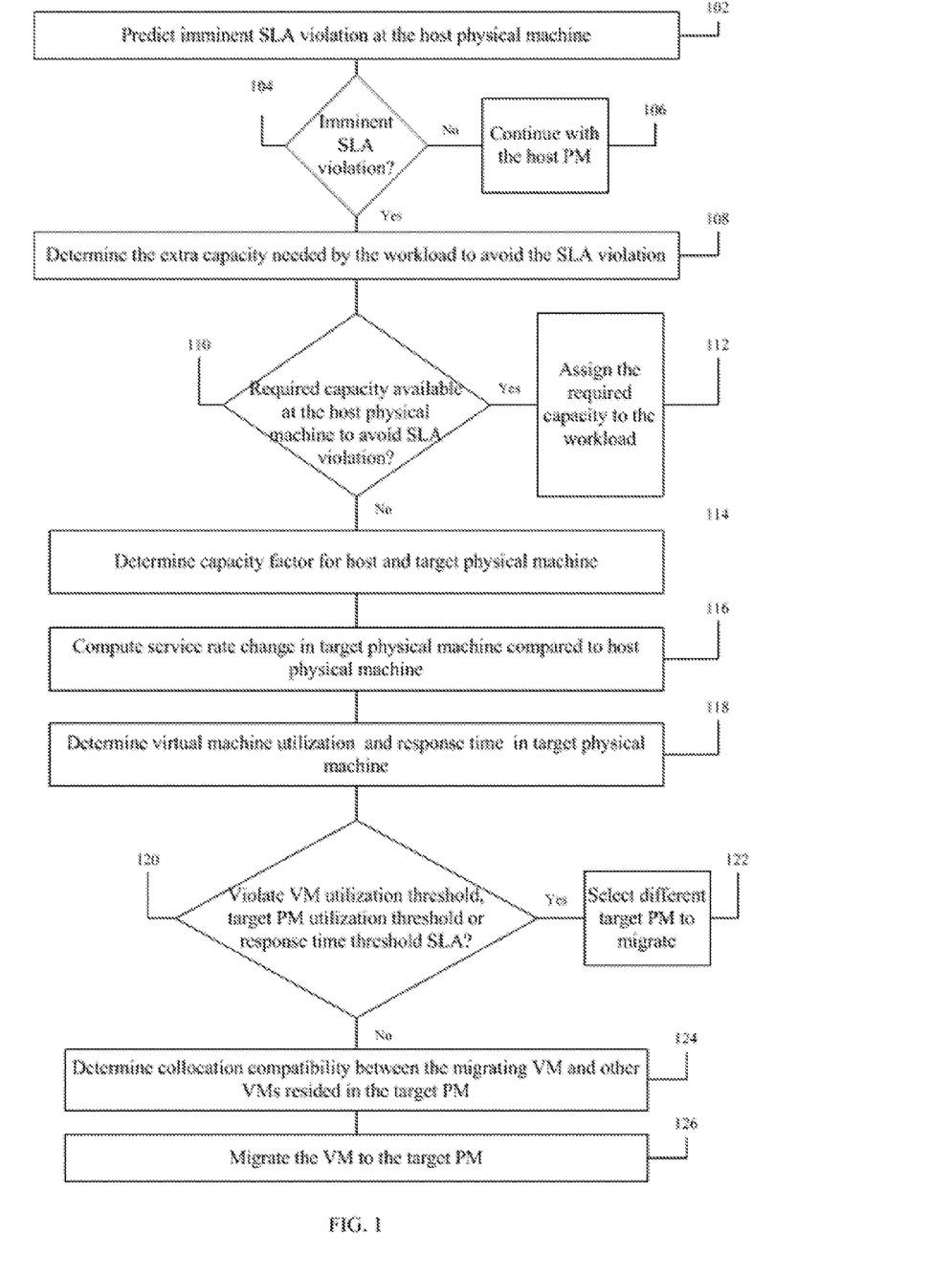
FIG. 1 is a flowchart, illustrating a method for preventing Service Level Agreement (SLA) violation during migration of a virtual machine from one virtualized physical server to another, in accordance with an embodiment of the present invention.
Figure 2:
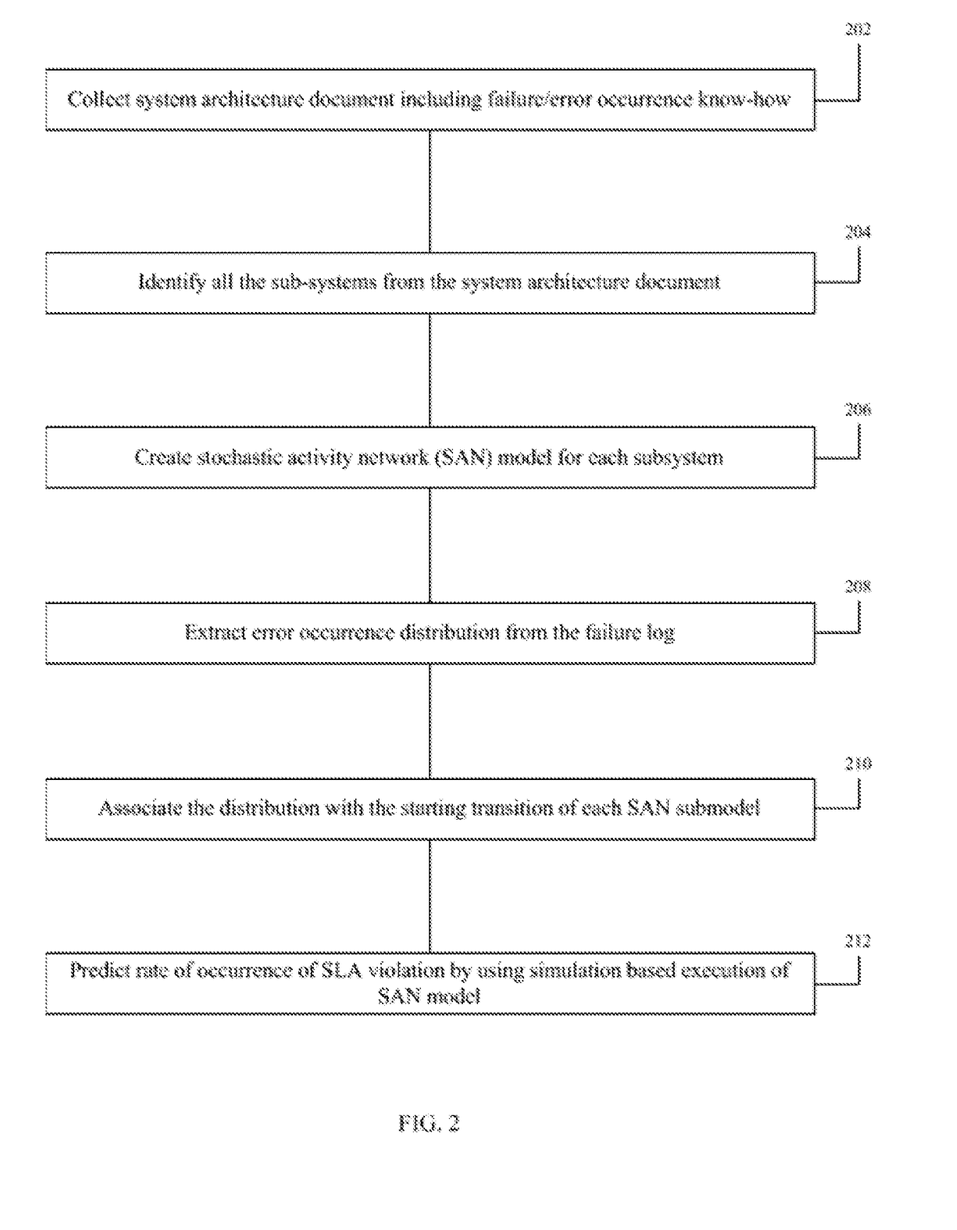
FIG. 2 is a flowchart, illustrating a method for predicting SLA violation of a workload, in accordance with an embodiment of the present invention.
Figure 3:
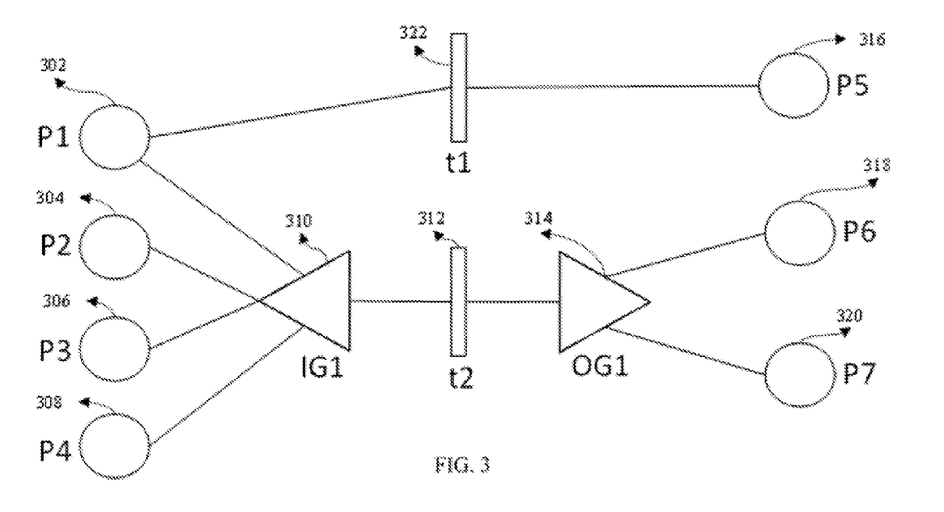
FIG. 3 is an exemplary stochastic activity network (SAN) model to predict the SLA violation of a workload, in accordance with an embodiment of the present invention.

FIG. 1 is a flowchart, illustrating a method for preventing Service Level Agreement (SLA) violation during migration of a virtual machine from one virtualized physical server to another, in accordance with an embodiment of the present invention. An imminent SLA violation at the host physical machine is predicted by a computing device at step 102. The imminent SLA violation is predicted based on the historical data of the workload and a predefined prediction model. The prediction model is created based on Stochastic Activity Network (SAN) model. FIG. 2 is a flowchart, illustrating a method for predicting SLA violation of a workload, in accordance with an embodiment of the present invention. System architecture documents, failure or error occurrence know-how and knowledge of system workflow are collected as in step 202. All the sub-systems are identified from the system architecture document, at step 204 and SAN model is created for each sub-system using failure or error information and system workflow information, at step 206. The SAN model is characterized by place, transition, input gate and output gate. A place is an object in the SAN model that contains tokens. The number of tokens in all the places of the SAN model together constitute the system state. Each place is usually connected to a transition. A transition fires following a timed distribution. Sometimes enabling of a transition depends on the number of tokens in multiple input places. This is termed as the enabling function associated with the input gate connected to the transition. Firing of a transition takes tokens from one or more input place and deposits them into one or more output places. Sometimes firing of a transition calls for the deposition of tokens into multiple places instead of one following a certain completion function. The places, transitions and gates for the stochastic activity network (SAN) of a portion of the distributed system (e.g., hardware subsystem of the data center) are created based on the system's architectural description as well as the system's workflow propagation information. To create the SAN model for depicting the underlying behavior of a distributed infrastructure hosting the SaaS service, places are created for each component or system objects. Then, the places are connected to transitions wherever relevant. If the enabling of transition depends on multiple places, then the associated input gates are created to the transitions connecting all the relevant places and the corresponding transition enabling function is defined. Then, the transitions are connected to the places where the firing of the transitions are going to affect. If the firing of the transition affect multiple places at the output, then associated output gates are created from the transition connecting all the places where firing is going to affect and the corresponding transition completion function is defined. FIG. 3 is an exemplary stochastic activity network (SAN) model to predict the SLA violation of a workload, in accordance with an embodiment of the present invention. This model is given only for understanding purpose and not to limit the scope of the disclosure. The model in FIG. 3 includes seven places (P1 to P7), two transitions (t1,t2), one input gate (IG1) and one output gate (OG1). The places P1 to P4 contain tokens related to basic memory management errors. The places include P1 (302) containing token related to software bug malloc and free in the software code, P2 (304) containing token related to internal fragmentation errors (when more memory is allocated to a program than is needed leading to wastage of memory space), P3 (306) containing token related to external fragmentation errors (when large memory blocks are broken down to small chunks with small empty spaces between chunks that are unusable) and P4 (308) containing token related to data fragmentation error (external fragmentation during storage of data). The enabling function for input gate IG1 (310) is such that there should be at least one token in 1 of the 4 places (P1-P4). This, in turn enables the transition t2 (312) to fire following a given distribution (for example, an exponential distribution with rate λ). When transition t2 (312) fires, its output gate OG1 (314) has a completion function distributing a token for memory leak error to place P6 (318) and a token for a memory fragmentation error to place P7 (320). Erroneous malloc and free can also give rise to other errors such as buffer overflow errors. Place P5 (316) contains tokens related to buffer overflow errors accumulated when transition t1 (322) fires.

Referring back to FIG. 2, error occurrence distribution is extracted from the failure logs, at step 208 and this distribution is associated with the starting transition of SAN model of each sub-system, at step 210. Firing of this first timed transition populates the places connected to it with tokens. These tokens propagate through rest of the SAN model passing through gates and transitions to generate mean time to failure (MTTF) for the application VM as well as times to occurrence for the different types of SLA violations. This SLA violation occurrence is predicted by simulation based execution of the SAN model, at step 212.

Referring back to FIG. 1, possibility of imminent SLA violation is determined at 104 and if the SLA violation prediction engine of the device does not find any imminent SLA violation, then the workload continues to reside in the host physical machine, as mentioned in step 106. On the other hand, if the SLA violation prediction engine of the device finds any imminent SLA violation, then it determines the extra capacity required by the VM and associated workload to avoid the SLA violation at step 108. This can be explained with the help of an example where the example is provided only for understanding purpose and not for limiting the scope of the disclosure. According to this example, if the VM capacity requirement is 50 rPerf unit (rPerf is a IBM benchmark that represent the system capacity) and as per SLA, VM utilization threshold is 60%, then the used capacity of the VM should be 60% of 50 rPerf units=30 rPerf units. If VM violates its utilization threshold and starts to use 70% of the total capacity, then the present used capacity will be 70% of 50 rPerf units=35 rPerf units. So, the extra capacity required by the VM to overcome the VM utilization threshold violation will be 60% of x rPerf units=35 rPerf units (where x is the new required capacity for this VM), thus x=58.333 rPerf units. So extra 8.33 rPerf units needed to overcome the VM utilization threshold. Similarly, the extra capacity required to overcome the response time threshold can also be explained by using another example. According to this example, response time threshold as per SLA is 5 sec and the present response time is 7 sec, i.e. it violates the SLA threshold. The response time can be determined by using Little's formula, $E[R]=1/(\mu-\lambda)$, where $E[R]$ is response time, $\mu$ is service rate and $\lambda$ is job arrival rate for certain assumed distributions of service rate and job arrivals. Arrival rate of jobs (λ) can't be changed as that is decided by the client. So service rate needs to be changed such that response time drops under 5 sec. This can be done by assigning more capacity to VM. The current service rate can be determined from $\mu_{current}=\lambda+(1/E[R_{current}])$ and the required service rate can be determined from $\mu_{required}=\lambda+(1/E[R_{threshold}])$.

Now, $\mu_{current}/\mu_{required}$=Current Capacity($C1$)/Required Capacity($C2$)

From the above equation, C2 can be calculated.

Referring back to FIG. 1, at step 110, it is determined if the required extra capacity is available at the host physical machine, i.e., if the extra capacity is assigned to the VM, it'll not cause the host PM utilization threshold violation. If the required extra capacity is present in the host PM then it assigns the extra capacity to the VM at step 112. On the other hand, if the assignment cause the host PM utilization threshold violation, then a target physical machine is required to be selected for VM migration. In an alternate embodiment, the VM can be migrated to a new target PM as soon as the prediction module finds any imminent SLA violation (not shown in the figure). The capacity factor for host and target physical machine is determined at step 114. As mentioned earlier, capacity factor is a ratio of the host physical machine capacity and target physical machine capacity. The capacity of the host and target physical machine can be determined by referring any benchmark value. In a preferred embodiment of this disclosure, rPerf benchmark value is used to determine underlying capacity of every physical machine. For example, if the rPerf value of the host physical machine and target physical machine are 58.96 and 115.86 respectively, then the capacity factor for these machine will be 115.86/58.96≈2. The service rate change in the target physical machine compared to host physical machine is determined at step 116. This can be determined based on the capacity factor. For example, if the capacity factor of the host and target physical machine is 2, then the service rate for jobs in the target physical machine will be doubled compared to the host physical machine. Virtual machine utilization threshold and response time in the target machine is determined at step 118. These can be determined by using Little's law or by using simulation techniques. From another analytical derivation of the Little's law, it is known that VM's utilization (ρ), $\rho_{target}=\lambda/\mu_{target}$, where, $\mu_{target}$ is service rate in the target machine and λ is job arrival rate which remains same in the host PM and target PM. Response time $E[R_{target}]$ in the target machine can be determined from the following formula of Little's law:

$$E[R_{target}]=1/(\mu_{target}-\lambda)$$

At step 120, it is determined if the VM utilization ($\rho_{target}$) and response time $E[R_{target}]$ in the target virtual machine are within the VM utilization threshold and response time threshold as per SLA. The step 120 further determines if the migration of the VM violates the target PM utilization threshold, i.e. the sum of utilization of all the VMs (including the migrating VM) in target PM should not increase the target PM's utilization threshold. If the migration of the VM in the target PM violates any of the SLA parameters, i.e. VM utilization threshold, PM utilization threshold or response time threshold, then a different target machine is required to be selected where all of the SLA parameters are satisfied, as mentioned in step 122. On the other hand, if the target machine satisfies all the SLA parameters, then collocation compatibility between the migrating VM and the one or more VMs already resided in the target PM is determined at step 124. Workloads serving geographical regions with complementary working time zones can be collocated. Also workloads with pattern characterized by Coefficient of Variation or CoV>1 is typical for internet traffic. Such workload's peak utilization is often very high compared to its average. While migrating such types of workload, the number of peak utilization overlaps between the migrating VM with that of the workloads running on the target PM is required to be considered and it also required to verify that the migrating workload has a minimum number of peak overlaps with the workloads on the target PM. The historical workload data is mined to extract tuples {peak utilization value, time of value}. Then the number of peak overlaps (WCPM) between the migrating workload and all the workloads on the target PM (PMi) is computed. The PM with minimum number of peak overlaps is selected for collocation. If the migrating VM is compatible with the other VMs in the target PM, then the VM is migrated to that target PM at step 126.

Figure 4:
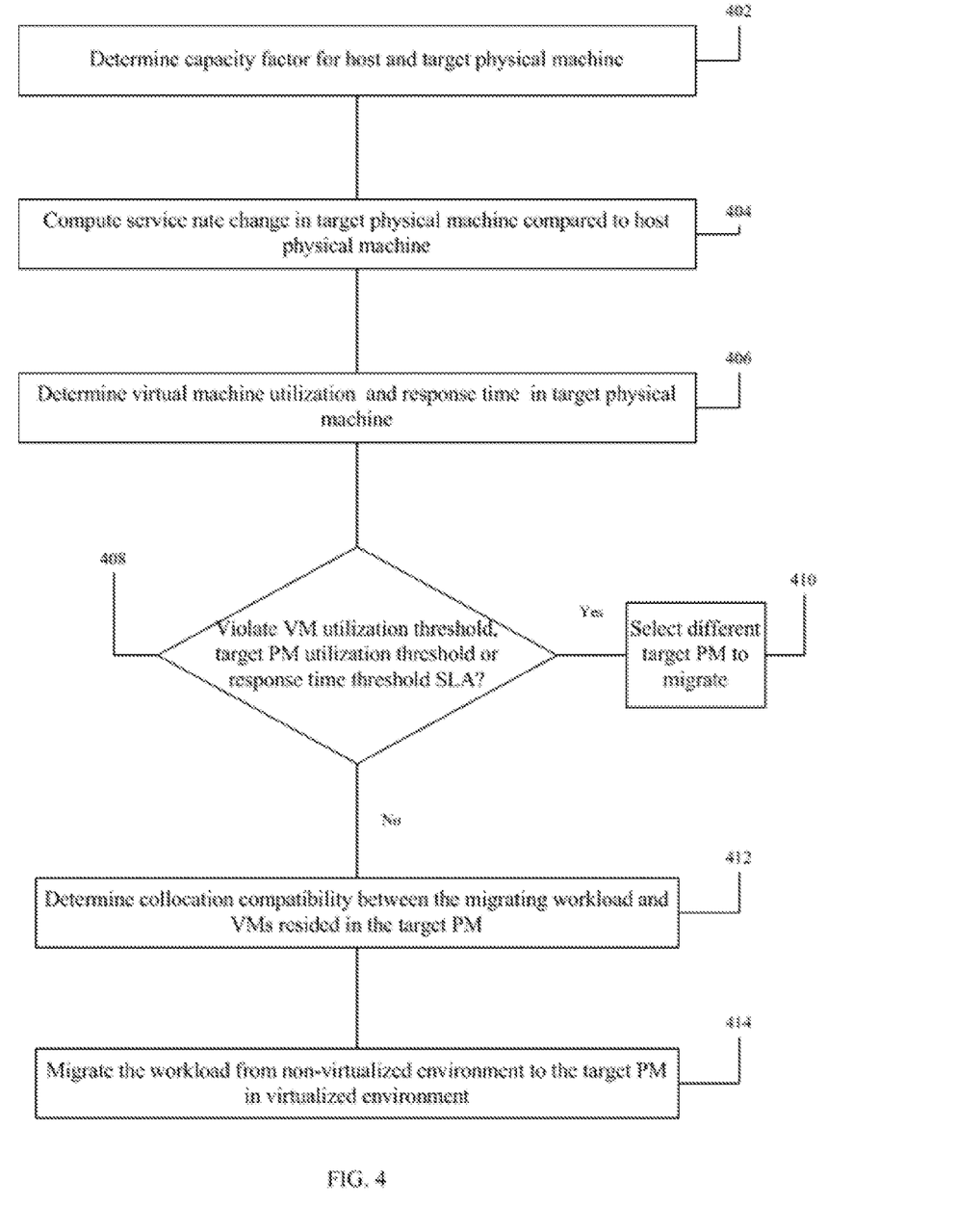
FIG. 4 is a flowchart, illustrating a method for preventing Service Level Agreement (SLA) violation during workload migration from a non-virtualized environment to a virtualized environment, in accordance with an embodiment of the present invention.

FIG. 4 is a flowchart, illustrating a method for preventing Service Level Agreement (SLA) violation during workload migration from a non-virtualized environment to a virtualized environment, in accordance with an embodiment of the present invention. In this case, the host physical machine is the physical machine in non-virtualized environment and target physical machine resides in virtual environment. The capacity factor, i.e. the ratio of the host physical machine capacity and target physical machine capacity, is determined at step 402. As mentioned earlier, the underlying capacity can be determined by referring a benchmark value. The service rate change in the target PM compared to the host PM is determined at step 404. The service rate change is determined based on the capacity factor. Virtual machine utilization and the response time in the target PM is determined at step 406. This can be determined based on the service rate in the target PM and the job arrival rate. The details of determining the VM utilization and response time in target machine is explained herein above with respect to step 118 of FIG. 1. At step 408, it is determined if the VM utilization and response time in the target virtual machine are within the VM utilization threshold and response time threshold as per SLA. The step 408 further determines if the migration of the workload violates the target PM's utilization threshold, i.e. the sum of utilization of all the VMs (including the migrating workload) in target PM should not increase the target PM's utilization threshold. If the migration of the workload in the target PM violates any of the SLA parameters, i.e. VM utilization threshold, PM utilization threshold or response time threshold, then a different target PM is required to be selected where all of the SLA parameters are satisfied, as mentioned in step 410. On the other hand, if the target machine satisfies all the SLA parameters, then collocation compatibility between the migrating VM and the one or more VMs already resided in the target PM is determined at step 412. If the migrating workload is compatible with the other VMs in the target PM, then the workload is migrated to that target PM at step 414.

Figure 5:
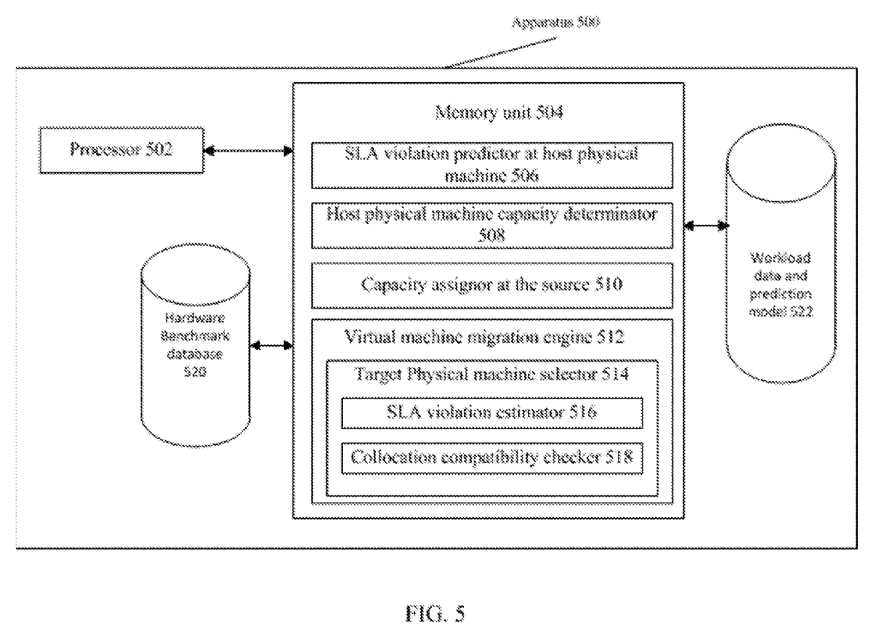
FIG. 5 is a block diagram, illustrating an apparatus for preventing Service Level Agreement (SLA) violation during migration of a virtual machine from one virtualized physical server to another, in accordance with an embodiment of the present invention.

FIG. 5 is a block diagram, illustrating an apparatus for preventing Service Level Agreement (SLA) violation during migration of a virtual machine from one virtualized physical server to another, in accordance with an embodiment of the present invention. The apparatus includes a processor 502, a memory unit 504, a hardware benchmark database 520, a database storing workload data and prediction model 522 which are coupled together by a bus or other link. The processor 502 executes a program of stored instructions for one or more aspects of the present technology as described and illustrated by way of the examples herein, although other types and numbers of processing devices and logic could be used and the processor could execute other numbers and types of programmed instructions. The hardware benchmark database 520 maintains publicly available hardware benchmarks. This database is updated periodically.

The memory 504 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 502, can be used for the memory 504. The memory 504 also includes SLA violation predictor 506, host physical machine capability determinator 508, capacity assignor 510, virtual machine migration engine 512. The SLA violation predictor 506 is configured to predict imminent SLA violation in the host PM based on the database which stores workload historical data and prediction model 522. The details of the prediction model is described herein above in FIG. 2 and FIG. 3. The host physical machine capability determinator 508 is configured to determine if the host physical machine has enough capacity to mitigate the SLA violation. This determines the extra capacity required by the VM to overcome the SLA violation and then check if the host PM is able to assign the extra capacity to the VM i.e. the extra capacity assignment does not violate the host PM utilization threshold. The capacity assignor 510 is configured to assign the required extra capacity to the VM if the assignment does not violate the host PM's utilization threshold. The virtual machine migration engine 512 is configured to migrate the VM to another PM (target PM) in the virtual environment to overcome the SLA violation. The virtual machine migration engine 512 includes target physical machine selector 514 configured to select a target PM where the VM should be migrated. The target physical machine selector 514 includes SLA violation estimator 516 and collocation compatibility checker 518. The SLA violation estimator 516 is configured to estimate the possibility of SLA violation if the VM is migrated to the target PM. The SLA violation estimator 516 determines the capacity factor for the host PM and target PM and then from that it determines the service rate change in the target machine compared to the host machine. The SLA violation estimator 516 further determines the VM utilization and response time in the target physical machine by using Little's law or simulation techniques. The details of determining VM utilization and response time in the target physical machine is described herein above with respect to step 118 of FIG. 1. Then, the SLA violation estimator 516 checks if the VM utilization and response time in the target physical machine lie within the SLA limit or not. Again, the SLA violation estimator 516 checks if the VM migration will violate the target PM's utilization threshold. If the SLA violation estimator 516 finds that the migration of the VM to the target PM will satisfy all the SLA parameter, then the target physical machine selector 514 selects that target PM and the virtual machine migration engine 512 migrates the VM to that selected target PM. The collocation compatibility checker 518 is configured to check the collocation compatibility between the migrating VM and the previously existing VMs in the target PM. The details of this is described herein above with respect to step 124 of FIG. 1.

Figure 6:
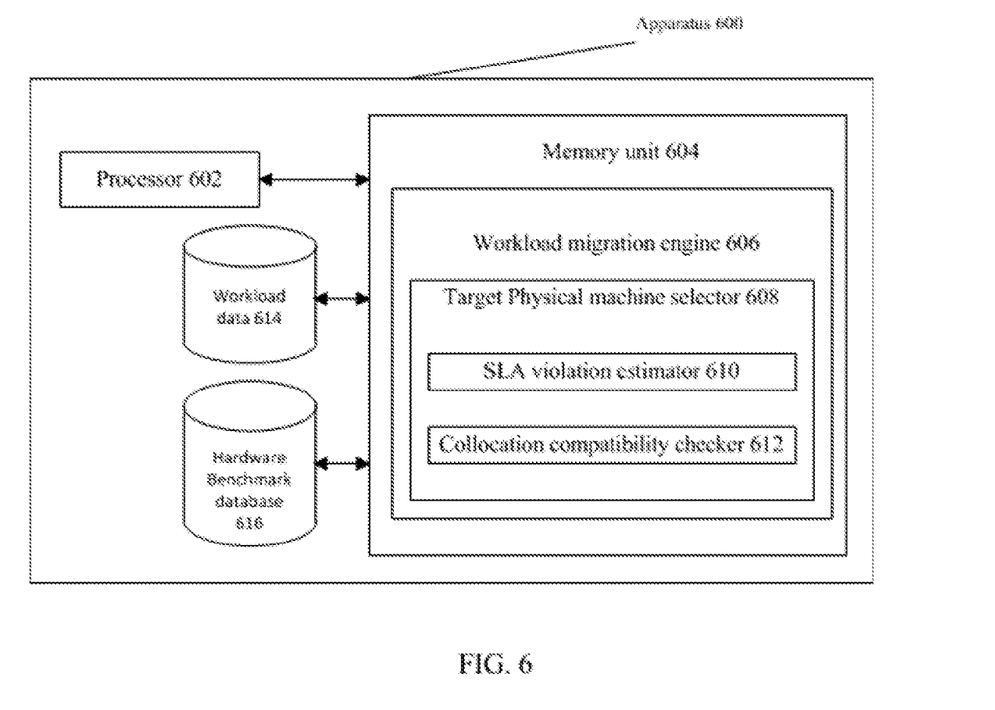
FIG. 6 is a block diagram, illustrating an apparatus for preventing Service Level Agreement (SLA) violation during workload migration from a non-virtualized environment to a virtualized environment, in accordance with an embodiment of the present invention.

FIG. 6 is a block diagram, illustrating an apparatus for preventing Service Level Agreement (SLA) violation during workload migration from a non-virtualized environment to a virtualized environment, in accordance with an embodiment of the present invention. The apparatus includes a processor 602, a memory unit 604, a hardware benchmark database 616, a workload database 614 storing all workload related data which are coupled together by a bus or other link. The processor 602 executes a program of stored instructions for one or more aspects of the present technology as described and illustrated by way of the examples herein, although other types and numbers of processing devices and logic could be used and the processor could execute other numbers and types of programmed instructions. The hardware benchmark database 616 maintains publicly available hardware benchmarks. This database is updated periodically.

The memory 604 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 602, can be used for the memory 604. The memory 604 also includes a workload migration engine 606 configured to migrate the workload from a host non-virtualized PM to a target virtualized PM. The virtual machine migration engine 606 includes a target PM selector 608 which in turn includes SLA violation estimator 610 and collocation compatibility checker 612. The SLA violation estimator 610 is configured to estimate the possibility of SLA violation if the workload is migrated to the target PM. The SLA violation estimator 610 determines the capacity factor for the host PM and target PM and then from that it determines the service rate change in the target machine compared to the host machine. The SLA violation estimator 610 further determines the VM utilization and response time in the target physical machine by using Little's law or simulation techniques. The details of determining VM utilization and response time in the target physical machine is described herein above with respect to step 118 of FIG. 1. Then, the SLA violation estimator 610 checks if the VM utilization and response time in the target physical machine lie within the SLA limit or not. Again, the SLA violation estimator 610 checks if the VM migration will violate the target PM's utilization threshold. If the SLA violation estimator 610 finds that the migration of the workload to the target PM will satisfy all the SLA parameter, then the target physical machine selector 608 selects that target PM and the workload migration engine 606 migrates the workload to that selected target PM. The collocation compatibility checker 612 is configured to check the collocation compatibility between the migrating workload and the previously existing VMs in the target PM.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer-implemented method executed by one or more computing devices for preventing Service Level Agreement (SLA) violation during migration of a virtual machine to a virtualized physical server, the method comprising:

determining, by at least one of the one or more computing devices, an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determining, by at least one of the one or more computing devices, a capacity factor for a host and a target physical machine in the virtual environment, wherein the capacity factor is a ratio of a host physical machine capacity and a target physical machine capacity;

computing, by at least one of the one or more computing devices, a change in a service rate in the target physical machine compared to a service rate in the host physical machine based on the capacity factor;

determining, by at least one of the one or more computing devices, a virtual machine utilization and a response time in the target physical machine based on the service rate change and an arrival rate of one or more jobs;

checking, by at least one of the one or more computing devices, when the virtual machine utilization and the response time in the target physical machine are within a predefined virtual machine utilization threshold and a response time threshold;

checking, by at least one of the one or more computing devices, when the virtual machine migration in the target physical machine is violating a predefined target physical machine utilization threshold; and migrating, by at least one of the one or more computing devices, the virtual machine to the target physical machine when the predefined virtual machine utilization threshold, the response time threshold and the target physical machine utilization threshold are not violated.

2. The method of claim 1, further comprising determining extra capacity needed to mitigate the imminent SLA violation in the host physical machine.

3. The method of claim 2, wherein the extra capacity is assigned to the workload when the assignment does not violate a predefined host physical machine utilization threshold.

4. The method of claim 2, wherein the workload is migrated to the target physical machine when the assignment of the extra capacity violates the predefined host physical machine utilization threshold.

5. The method of claim 1, further comprising checking collocation compatibility between the migrating virtual machine and one or more virtual machines that reside on the target physical machine.

6. The method of claim 1, wherein the capacity factor is determined based on a benchmark value of the host and the target physical machine.

7. The method of claim 1, wherein the virtual machine utilization and the response time is determined by using Little's Law or simulation techniques.

8. A computer-implemented method executed by one or more computing devices for preventing Service Level Agreement (SLA) violation during workload migration from a non-virtualized environment to a virtualized environment, the method comprising:

determining an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determining, by at least one of the one or more computing devices, a capacity factor for a host physical machine in the non-virtualized environment and a target physical machine in the virtualized environment, wherein the capacity factor is a ratio of a host physical machine capacity and a target physical machine capacity;

computing, by at least one of the one or more computing devices, a change in a service rate in the target physical machine compared to a service rate in the host physical machine based on the capacity factor;

determining, by at least one of the one or more computing devices, a virtual machine utilization and a response time in the target physical machine based on the service rate change and an arrival rate of one or more jobs;

checking, by at least one of the one or more computing devices, when the virtual machine utilization and the response time in the target physical machine are within a predefined virtual machine utilization threshold and a response time threshold;

checking, by at least one of the one or more computing devices, when the workload migration in the target physical machine is violating a predefined target physical machine utilization threshold; and migrating, by at least one of the one or more computing devices, the workload to the target physical machine when the predefined virtual machine utilization threshold, the response time threshold and the target physical machine utilization threshold are not violated.

9. The method of claim 8, wherein the virtual machine utilization and the response time is determined by using Little's Law.

10. The method of claim 8, further comprising checking a collocation compatibility between the migrating workload and one or more virtual machines that reside on the target physical machine.

11. An apparatus for preventing Service Level Agreement (SLA) violation during migration of a virtual machine to a virtualized physical server, the apparatus comprising:

one or more processors; and one or more memory units operatively coupled to at least one of the one or more processors and having instructions stored thereon that, when executed by at least one of the one or more processors, cause at least one of the one or more processors to:

determine an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determine a capacity factor for a host and a target physical machine in the virtual environment, wherein the capacity factor is a ratio of a host physical machine capacity and a target physical machine capacity;

compute a change in a service rate in the target physical machine compared to the service rate in the host physical machine based on the capacity factor;

determine a virtual machine utilization and a response time in the target physical machine based on the service rate change and an arrival rate of one or more jobs;

check when the virtual machine utilization and the response time in the target physical machine are within a predefined virtual machine utilization threshold and a response time threshold;

check when the virtual machine migration in the target physical machine is violating a predefined target physical machine utilization threshold; and migrate the virtual machine to the target physical machine when the predefined virtual machine utilization threshold, the response time threshold and the target physical machine utilization threshold are not violated.

12. The apparatus of claim 11, wherein the historical workload data and the prediction model are stored in a database.

13. The apparatus of claim 11, wherein the one or more memory units store further instructions to cause at least one of the one or more processors to determine extra capacity needed to mitigate the imminent SLA violation in the host physical machine.

14. The apparatus of claim 13, wherein the extra capacity is assigned to the workload when the assignment does not violate a predefined host physical machine utilization threshold.

15. The apparatus of claim 13, wherein the workload is migrated to the target physical machine when the assignment of the extra capacity violates the predefined host physical machine utilization threshold.

16. The apparatus of claim 11, wherein the one or more memory units store further instructions to cause at least one of the one or more processors to check a collocation compatibility between the migrating virtual machine and one or more virtual machines that reside on the target physical machine.

17. The apparatus of claim 11, wherein the capacity factor is determined based on a benchmark value of the host and the target physical machine.

18. The apparatus of claim 11, wherein the virtual machine utilization and the response time is determined by using Little's Law or simulation techniques.

19. An apparatus for preventing Service Level Agreement (SLA) violation during workload migration from a non-virtualized environment to a virtualized environment, the apparatus comprising:

one or more processors; and one or more memory units operatively coupled to at least one of the one or more processors and having instructions stored thereon that, when executed by at least one of the one or more processors, cause at least one of the one or more processors to:

determine an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determine a capacity factor for a host physical machine in the non-virtualized environment and a target physical machine in the virtualized environment, wherein the capacity factor is a ratio of a host physical machine capacity and a target physical machine capacity;

compute a change in a service rate in the target physical machine compared to a service rate in the host physical machine based on the capacity factor;

determine a virtual machine utilization and a response time in the target physical machine based on the service rate change and an arrival rate of one or more jobs;

check when the virtual machine utilization and a response time in the target physical machine are within a predefined virtual machine utilization threshold and a response time threshold;

check when the workload migration in the target physical machine is violating a predefined target physical machine utilization threshold; and migrate the workload to the target physical machine when the predefined virtual machine utilization threshold, the response time threshold and the target physical machine utilization threshold are not violated.

20. The apparatus of claim 19, wherein the virtual machine utilization and the response time is determined by using Little's Law.

21. The apparatus of claim 19, wherein the one or more memory units store further instructions to cause at least one of the one or more processors to check collocation compatibility between the migrating workload and one or more virtual machines that reside on the target physical machine.

22. A non-transitory computer readable medium having stored thereon instructions for preventing Service Level Agreement (SLA) violation during migration of a virtual machine to a virtualized physical server, the instructions comprising machine executable code which when executed by at least one processor, causes the at least one processor to perform steps comprising:

determining an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determining a capacity factor for host and a target physical machine in the virtual environment, wherein the capacity factor is a ratio of host physical machine capacity and a target physical machine capacity;

computing a change in a service rate in the target physical machine compared to the service rate in the host physical machine based on the capacity factor;

determining a virtual machine utilization and a response time in the target physical machine based on the service rate change and an arrival rate of one or more jobs;

checking when the virtual machine utilization and the response time in the target physical machine are within a predefined virtual machine utilization threshold and a response time threshold;

checking when the virtual machine migration in the target physical machine is violating a predefined target physical machine utilization threshold; and migrating the virtual machine to the target physical machine when the predefined virtual machine utilization threshold, the response time threshold and the target physical machine utilization threshold are not violated.

23. A non-transitory computer readable medium having stored thereon instructions for preventing Service Level Agreement (SLA) violation during workload migration from a non-virtualized environment to a virtualized environment, the instructions comprising machine executable code which when executed by at least one processor, causes the at least one processor to perform steps comprising:

determining an imminent SLA violation of a workload associated with the virtual machine in its current environment based on historical data of the workload and a stochastic activity network model, wherein the workload continues to reside on the virtual machine in its current environment when the determination indicates an SLA violation is not imminent;

determining a capacity factor for a host physical machine in the non-virtualized environment and a target physical machine in the virtualized environment, wherein the capacity factor is a ratio of host physical machine capacity and a target physical machine capacity;

computing a change in a service rate in the target physical machine compared to the service rate in the host physical machine based on the capacity factor;

determining a virtual machine utilization and a response time in the target physical machine based on the service rate change and an arrival rate of one or more jobs;

checking when the virtual machine utilization and the response time in the target physical machine are within a predefined virtual machine utilization threshold and a response time threshold;

checking when the workload migration in the target physical machine is violating a predefined target physical machine utilization threshold; and migrating the workload to the target physical machine when the predefined virtual machine utilization threshold, the response time threshold and the target physical machine utilization threshold are not violated.

* * * * *